Patented Nov. 15, 1938

2,137,101

UNITED STATES PATENT OFFICE 2,137,101

PROCESS FOR PREPARING CATALYSTS FOR HYDROGEN PRODUCTION

William E. Spicer, Baton Rouge, La., assignor to Standard Oil Development Company, a corporation of Delaware No Drawing. Application December 17, 1935, Serial No. 54,854

20 Claims. (Cl. 23—233)

This invention relates to an improved process for preparing catalysts for reactions conducted at high temperatures of the order of 900° F. and upwards, and more particularly to an improved method for preparing strong catalysts by forming tablets, pills, or other lumps by compressing a powder containing active catalytic elements such as difficultly reducible oxides. It is a special object of this invention to provide a process for making strong catalysts in pill form containing nickel and a difficultly reducible oxide for use in the production of hydrogen by the reaction between steam and a hydrocarbon.

Hydrogen is prepared by passing a hydrocarbon vapor (preferably a normally gaseous hydrocarbon) and steam or carbon dioxide over a catalyst containing nickel, or other suitable metal, at a high temperature. It has been suggested to use oxides of metals which are not reducible by hydrogen at the reaction temperature as a diluent and support for the catalytic metal. Alumina, silica, chromic oxide and magnesia are examples of suitable oxides, but any oxide which is not reduced by hydrogen at temperatures of about 2000 to 3000° F. and which is solid at 2000° F., is suitable for this purpose.

The production of hydrogen from hydrocarbons and steam involves high temperatures and gas rates which cause a rapid reduction of many catalysts to powder, or dust, and render them unsuitable. It is accordingly desirable to use very rugged catalysts in this process, but at the same time the catalysts must also show a high degree of activity.

One method for preparing strong catalysts is by grinding into a powder a mixture of the catalyst components, and then compressing this powder into lumps or tablets. These tablets are further strengthened by the addition of small amounts of inorganic compounds which react with the metal oxides to form metal compounds which have a fusion temperature above the maximum temperature at which the catalyst is exposed in use, say above 2000 to 3000° F. Such inorganic compounds are preferably weakly acidic, when the difficultly reducible oxide is basic, and have a melting point below about 1000 to 1500° F., in order to permit intimate mixing and rapid reaction with the metal oxides of the catalyst composition. Examples of such inorganic compounds which may be used are the acids, oxides and salts of fluorine, silicon, tin, germanium, bismuth, aluminum, lead, boron, tungsten, and the like, such as sodium fluoride, silica, sodium silicate, alumina, boric acid and tungstic acid. When the metal oxide associated with the nickel is alumina, chromium oxide or some other acidic oxide, the substance added to impart strength is preferably a basic oxide such as magnesia or some other alkaline earth oxide. Such compounds are added in small amounts of usually about ½ to 2 to 10%, though these limits may be exceeded. Strength is imparted to the catalyst by these additions only when the catalyst mixture is heated up during its preparation to a temperature sufficiently high to cause a reaction to occur between the difficultly reducible oxide and the added substance, usually at a temperature not less than 1700° F.

The catalyst preferably contains a larger amount of the metal oxide than of nickel or other active catalytic metal. For example, the catalyst may consist of 50% or more of magnesia and the remainder of a catalytic metal such as nickel. Catalysts containing about 75% of magnesia and 25% of nickel are preferred.

It has now been found that if a small amount of a lubricant is present in the powdered catalyst composition and the compressed tablets are then treated so as to remove the lubricant, both the formation of the tablets and the tablets themselves are greatly improved. The lubricant is preferably one that is combustible, and is completely removed from the catalyst tablets on heating to a temperature above about 1600° F. in air. Examples of such lubricants are the fatty acids, such as stearic acid, oleic acid, and the mixed fatty acids obtained on limited oxidation of paraffin wax; also high boiling viscous esters such as the natural glyceride esters of the fatty acids, including the natural oils, fats, and waxes, also hydrocarbon lubricants such as the petroleum lubricating oils and waxes. Since nickel catalysts are sensitive to even slight traces of sulfur, it is preferable that the lubricants used with such catalysts be substantially free of sulfur.

The following examples are presented to indicate suitable specific embodiments of the present invention, and are not to be considered as limiting this invention in any way:

Example I 1455 parts by weight of nickel nitrate hexahydrate were dissolved in 500 parts of water. 750 parts of magnesium oxide were then slowly added to the solution with stirring and the resulting paste was dried and heated at about 850–900° F. to convert the nitrates to oxides and to drive off the oxides of nitrogen. The heated powder was passed through a 10 mesh screen and was then formed into a dense mass by compression, using pressures of the order of 10,000 pounds per square inch in a tablet machine. The tablets were in the form of right cylinders, ⅜ inch in diameter and ⅜ inch in height. The tablets first formed were crushed to about 10 mesh and then again formed into tablets, thereby removing occluded air and improving their strength. The second tablets were then heated in air to a temperature of 1700 to 2000° F. for about 36 hours. The nickel oxide in the heated tablets was then reduced to metallic nickel by passing hydrogen over them at the same temperature for about 6 hours.

The strength of the tablets, measured as the maximum load in pounds carried by the tablet, without crushing, when applied to diagonally opposite sides of the cylinder, was 23 pounds.

Example II

Tablets were formed, heated, reduced and tested for strength, as in Example I, with the exception that 1% of stearic acid was mixed thoroughly with the heated powder of nickel and magnesium oxides before the tabletting operation. The tabletting operation was conducted much more smoothly than in Example I.

The strength of the tablets thus prepared from a mixture containing stearic acid was 32 pounds.

Example III

Tablets were formed as in Example I with the exception that 2% of boric acid was added to the nickel nitrate solution. The strength of the tablets thus prepared was 35 pounds.

Example IV

Tablets were prepared as in Example I with the exception that 1% of stearic acid and 2% of boric acid were added as in Examples II and III. The strength of the tablets thus prepared from a mixture containing both stearic acid and boric acid was 39 pounds.

Various modifications may obviously be made in the methods described above without departing from the scope of this invention, which is not to be limited by any examples or explanations presented herein, all of which are presented solely for purpose of illustration. This invention is to be limited only by the following claims, in which it is desired to claim all novelty insofar as the prior art permits.

I claim:

1. Process for preparing an improved catalyst suitable for hydrogen production by reaction of hydrocarbon and steam, comprising mixing a small amount of combustible lubricant with a powder containing nickel and a metal oxide not reducible with hydrogen under the conditions of said reaction, compressing the mixture into dense lumps, heating the lumps in an oxidizing atmosphere at a temperature above about 1600° F. and heating said lumps in a reducing atmosphere at about said temperature.

2. Process according to claim 1, in which said lubricant is a fatty acid.

3. Process according to claim 1, in which said lubricant is stearic acid.

4. Process according to claim 1, in which said powder contains nickel oxide.

5. Process according to claim 1, in which said powder contains a small amount of an inorganic compound reactive with said oxide at said temperature to form a metal compound which has a fusion temperature above about 2000° F.

6. Process according to claim 1, in which said powder contains a small amount of a weakly acidic inorganic compound reactive with said oxide at said temperature to form a compound therewith which has a fusion temperature above about 2000° F.

7. Process according to claim 1, in which said powder contains a small amount of a weakly acidic inorganic compound reactive with said oxide at said temperature to form a compound therewith which has a fusion temperature above about 2000° F., said lubricant is a fatty acid, and said oxide is magnesia.

8. Process for preparing an improved catalyst, comprising mixing into a powder nickel oxide, a greater amount of magnesium oxide, about 2% of a weakly acidic inorganic compound reactive with said oxide at said temperature to form a compound therewith which has a fusion temperature above about 2000° F., and about ½ to 2% of a combustible lubricant, tabletting said powder, heating the tablets in an oxidizing atmosphere at a temperature above about 1600° F. and then heating in a reducing atmosphere at about said temperature.

9. Process according to claim 8, in which said lubricant is a fatty acid.

10. Process according to claim 8, in which said lubricant is a mixture of fatty acids, prepared by limited oxidation of paraffin wax.

11. A catalyst obtained by the process defined in claim 1.

12. A catalyst obtained by the process defined in claim 8.

13. Process for preparing an improved catalyst suitable for hydrogen production by reaction of hydrocarbon and steam comprising mixing from ½ to 2% of a combustible lubricant with a powder containing nickel and a metal oxide not reducible with hydrogen under the conditions of said reaction, compressing the mixture into dense lumps, heating the lumps in an oxidizing atmosphere at a temperature above 1600° F. and heating said lumps in a reducing atmosphere at about said temperature.

14. Process in accordance with claim 13 in which said combustible lubricant is a fatty acid.

15. Process in accordance with claim 13 in which said combustible lubricant is stearic acid.

16. Process for preparing an improved catalyst suitable for hydrogen production by reaction of hydrocarbon and steam comprising mixing from ½ to 2% of a combustible lubricant with a powder containing nickel, a metal oxide not reducible with hydrogen under the conditions of said reaction, and from ½ to 10% of an inorganic weakly acidic compound, reactive with the metal oxide, compressing the mixture into dense lumps, heating the lumps in an oxidizing atmosphere at a temperature above 1600° F. and heating said lumps in a reducing atmosphere at about said temperature.

17. Process for preparing an improved catalyst suitable for hydrogen production by reaction of hydrocarbon and steam, comprising mixing from ½ to 2% of a combustible lubricant with a catalyst powder comprising 50–75% magnesium oxide, 20–25% nickel, compressing the mixture into dense lumps, heating the lumps in an oxidizing atmosphere at a temperature above 1600° F. and heating said lumps in a reducing atmosphere at about said temperature.

18. Process for preparing an improved catalyst for hydrogen production by reaction of hydrocarbon and steam, comprising mixing a small amount of combustible lubricant with a powder containing nickel and a metal oxide not reducible with hydrogen under the conditions of said reaction, compressing the mixture into dense lumps, heating the lumps in an oxidizing atmosphere at a temperature above about 1600° F. and heating said lumps in a reducing atmosphere at about said temperature.

19. Process according to claim 18 in which the combustible lubricant is present in the concentration of from ½ to 2%.

20. A catalyst obtained by the process defined in claim 13.

WILLIAM E. SPICER.